US011772905B2

(12) United States Patent
Staal et al.

(10) Patent No.: US 11,772,905 B2
(45) Date of Patent: Oct. 3, 2023

(54) BOARD TURNER

(71) Applicant: USNR, LLC, Woodland, WA (US)

(72) Inventors: Tim Staal, Salmon Arm (CA); Thomas Congdon, Salmon Arm (CA)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 17/356,449

(22) Filed: Jun. 23, 2021

(65) Prior Publication Data

US 2021/0316948 A1 Oct. 14, 2021

Related U.S. Application Data

(63) Continuation of application No. 16/796,831, filed on Feb. 20, 2020, now Pat. No. 11,072,499, which is a continuation of application No. 16/258,470, filed on Jan. 25, 2019, now Pat. No. 10,569,970, which is a continuation of application No. 15/351,378, filed on Nov. 14, 2016, now Pat. No. 10,239,703.

(60) Provisional application No. 62/254,714, filed on Nov. 13, 2015.

(51) Int. Cl.
*B65G 47/248* (2006.01)
*B65G 19/26* (2006.01)
*B65G 17/16* (2006.01)

(52) U.S. Cl.
CPC ......... *B65G 47/248* (2013.01); *B65G 17/16* (2013.01); *B65G 19/265* (2013.01); *B65G 2201/022* (2013.01); *B65G 2201/0282* (2013.01)

(58) Field of Classification Search
CPC .... B65G 47/248; B65G 17/16; B65G 19/265; B65G 2201/022; B65G 2201/0282
See application file for complete search history.

(56) References Cited

U.S. PATENT DOCUMENTS 3,887,066 A * 6/1975 Houtsager ............ B65G 47/252
198/403
7,153,086 B2 * 12/2006 Kauppila ............. B65G 47/252
198/402

(Continued)

FOREIGN PATENT DOCUMENTS

CA 2491620 A1 * 7/2005 ........... B65G 47/248
EP 1597177 A1 * 11/2005 ............. B65G 47/24

OTHER PUBLICATIONS

European Patent Office—Article 94(3) issued May 10, 2022 from European Patent Application No. 16865249.3, 6 pages.

*Primary Examiner* — Gene O Crawford
*Assistant Examiner* — Lester Rushin, III
(74) *Attorney, Agent, or Firm* — Schwabe, Williamson & Wyatt, P.C.

(57) ABSTRACT

A board turner assembly may include an endless chain, first and second groups of turning arms pivotably coupled with the endless chain and disposed along opposite sides thereof, an upper guide with an inclined surface, an actuator selectively operable to move the upper guide between a resting position and an extended position, and one or more endless belts. The turning arms may be spaced apart at regular intervals that are offset on one side of the chain relative to the other. The groups of turning arms may be operated in an alternating fashion to turn selected boards to a desired orientation (e.g., wane side up). Corresponding methods and systems are also described.

19 Claims, 13 Drawing Sheets

SECTION B-B

(56) References Cited

U.S. PATENT DOCUMENTS

2005/0150743 A1* 7/2005 Henderson ........... B65G 47/248
  198/403
2007/0215439 A1* 9/2007 Kauppila ............. B65G 47/248
  198/404

* cited by examiner

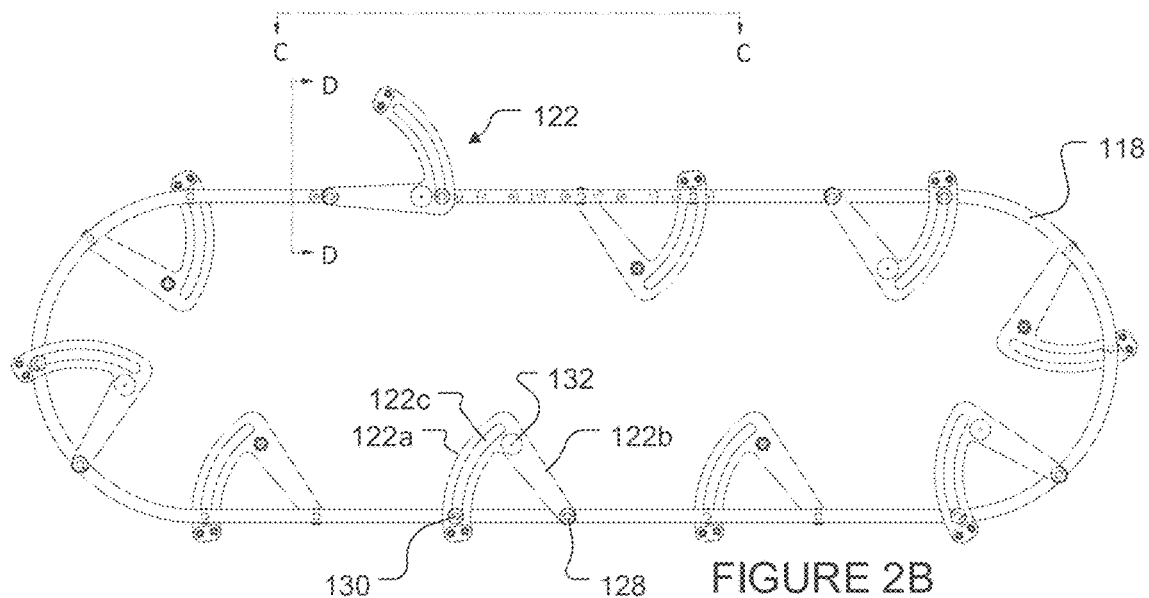
FIGURE 2B
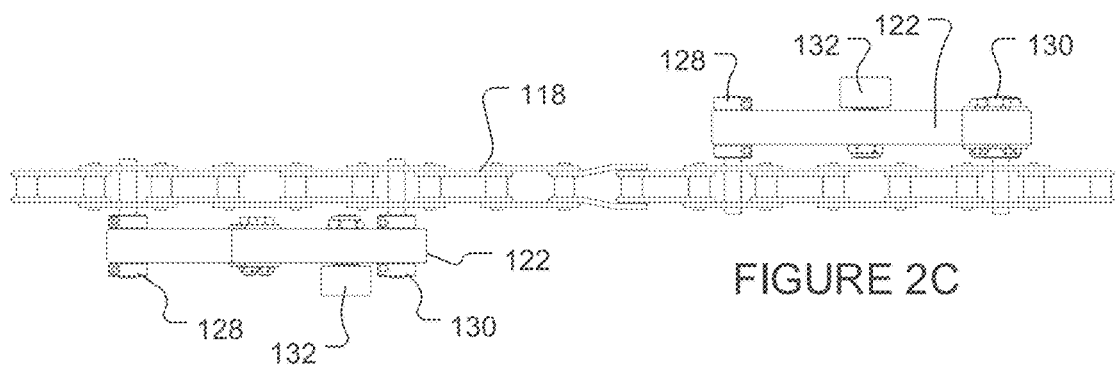
FIGURE 2C
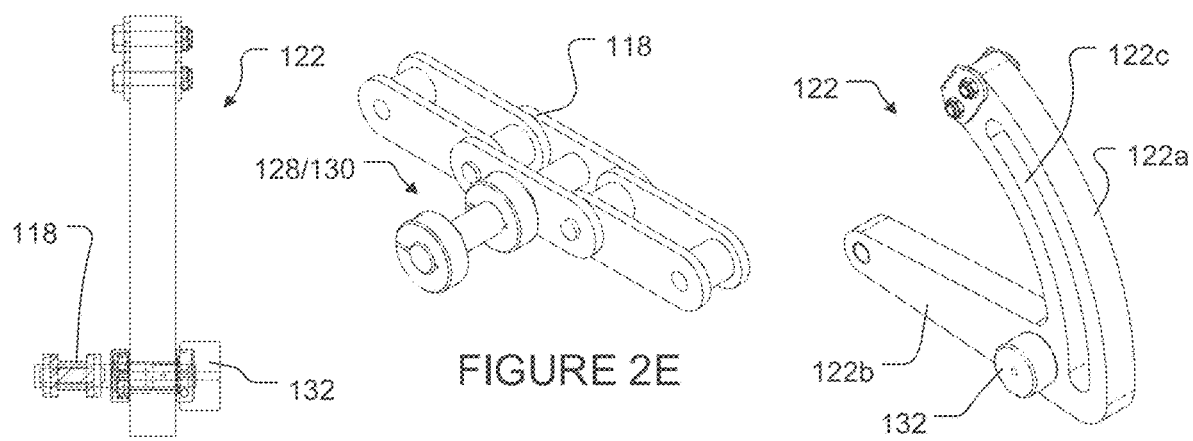
FIGURE 2D
FIGURE 2E
FIGURE 2F

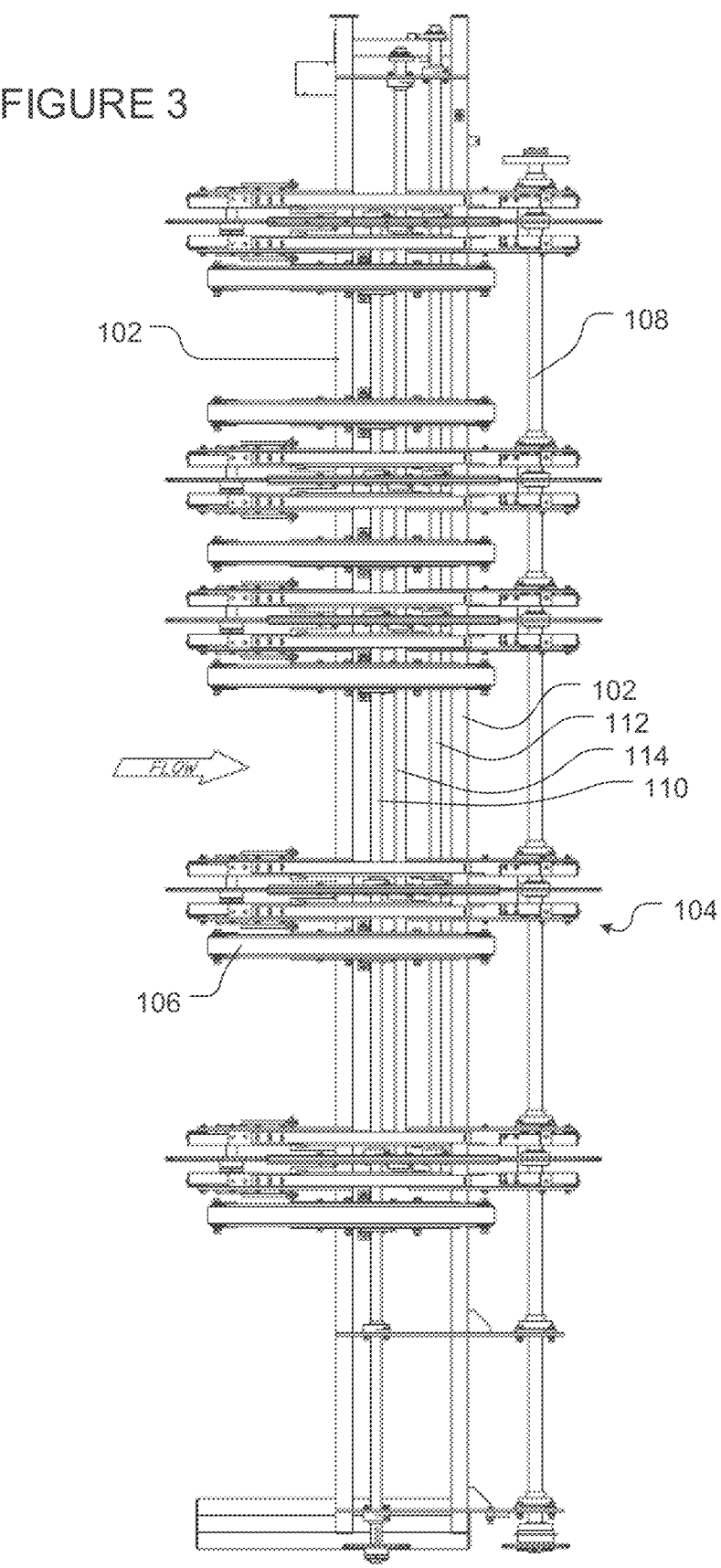

SECTION A-A

SECTION B-B

SECTION C-C

SECTION D-D

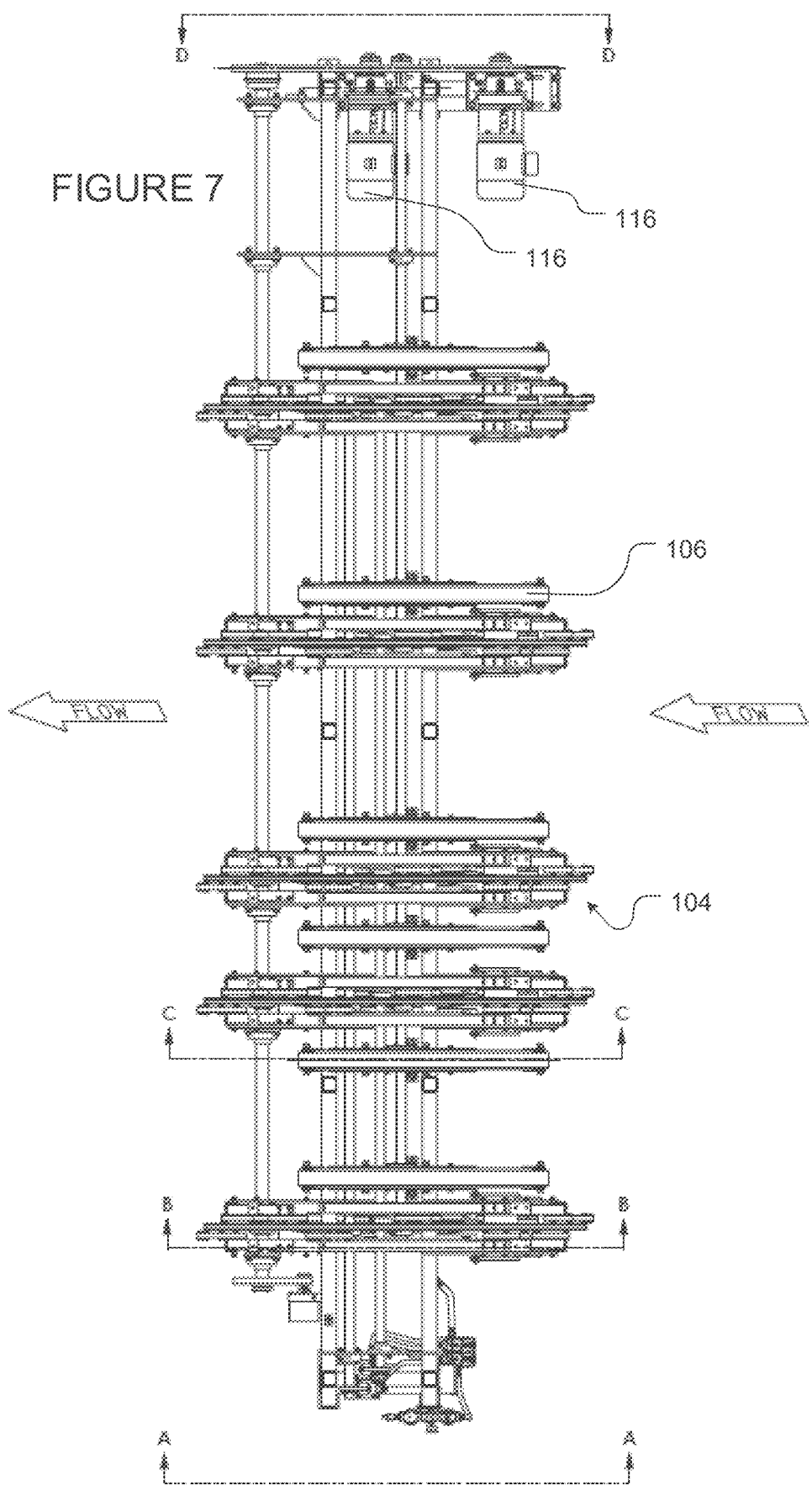

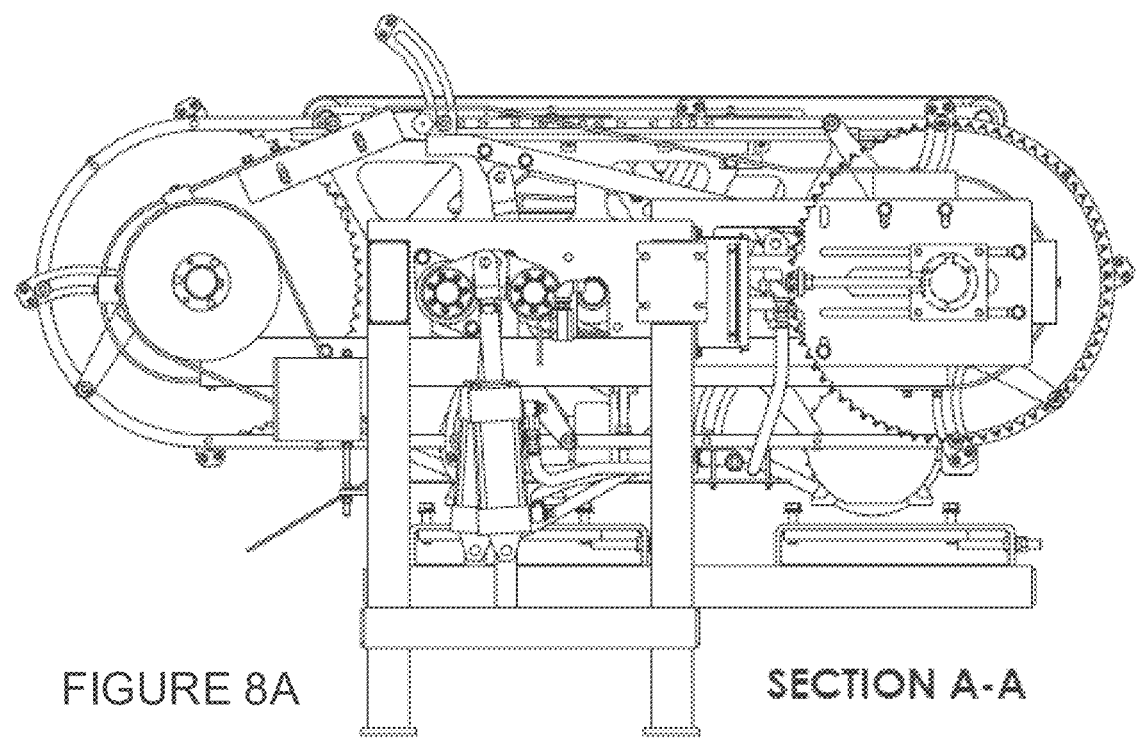
FIGURE 8A  SECTION A-A
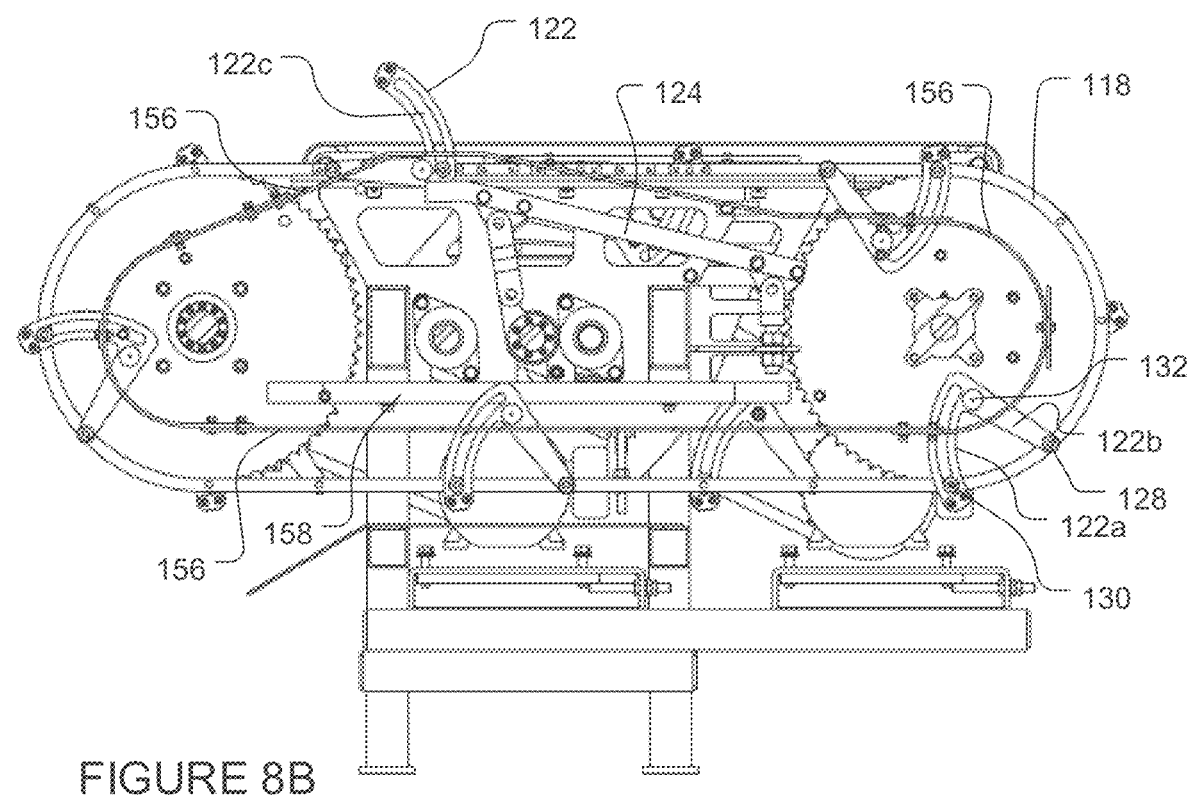
FIGURE 8B  SECTION B-B

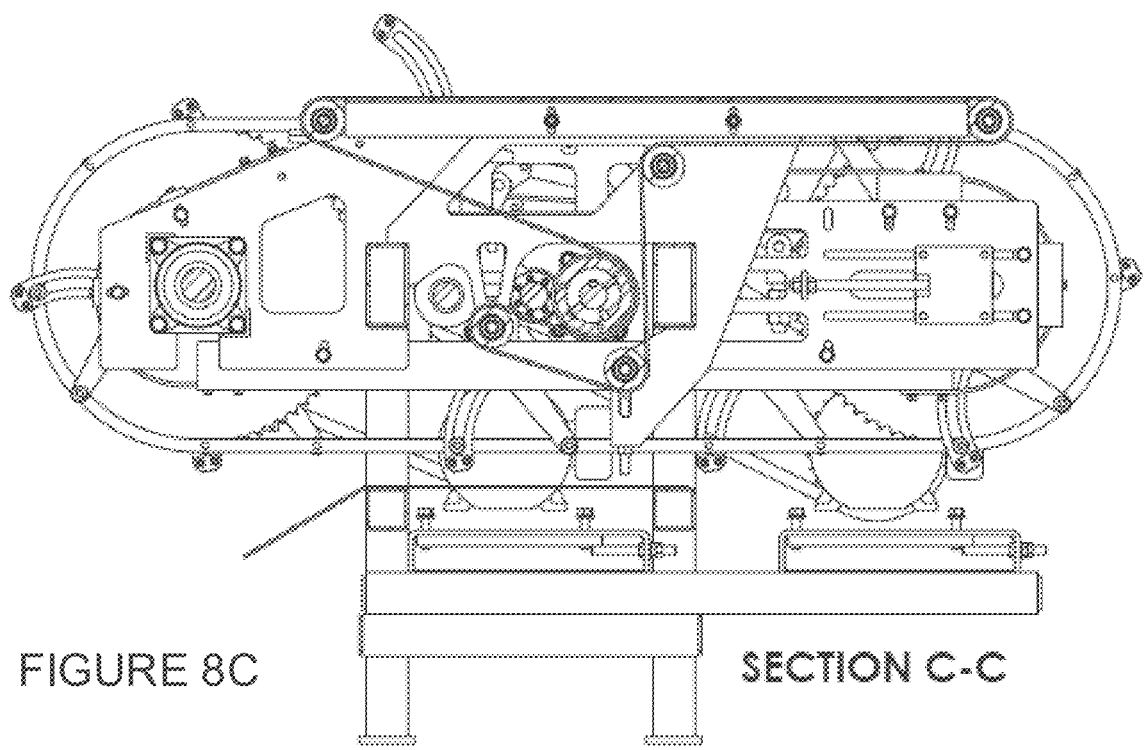
FIGURE 8C  SECTION C-C
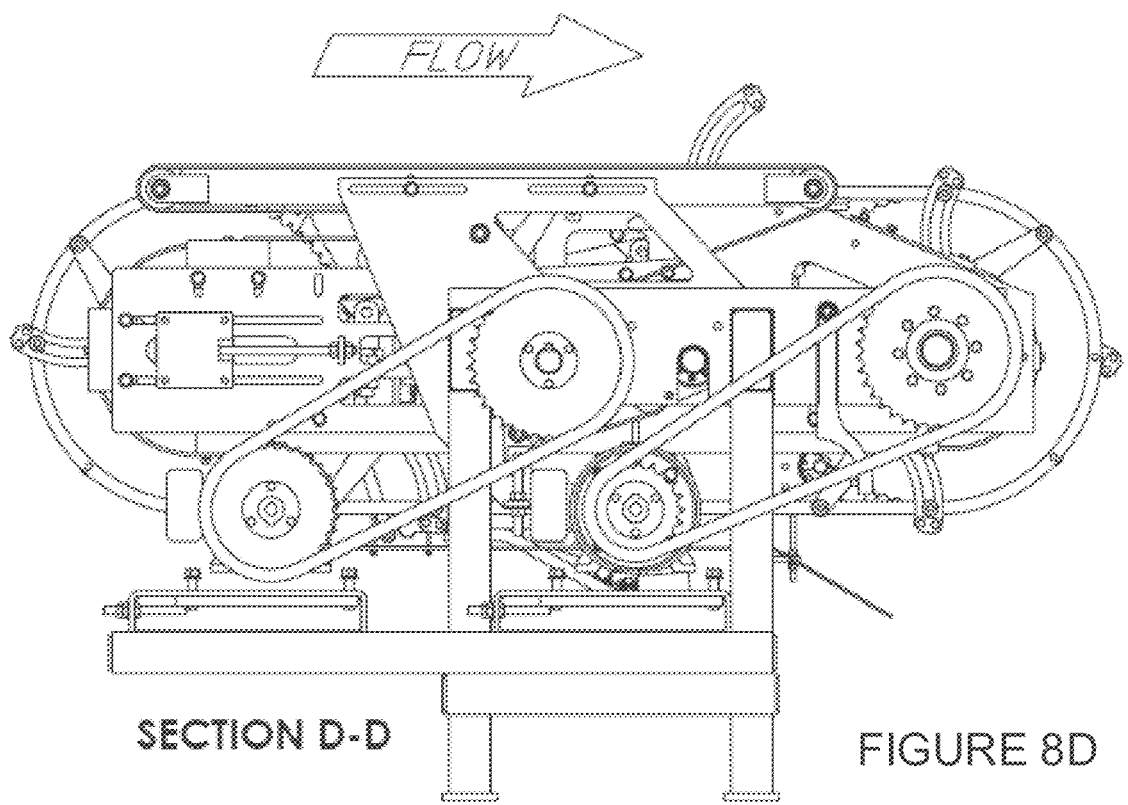
SECTION D-D  FIGURE 8D

BOARD TURNER

RELATED APPLICATIONS

The present application is a continuation of U.S. patent application Ser. No. 16/796,831, filed Feb. 20, 2020 which is a continuation of U.S. patent application Ser. No. 16/258,470, filed Jan. 25, 2019, now U.S. Pat. No. 10,569,970, which claims priority to U.S. patent application Ser. No. 15/351,378, filed Nov. 14, 2016, now U.S. Pat. No. 10,239,703, which claims priority to U.S. Provisional Patent Application No. 62/254,714, filed Nov. 13, 2015, all entitled "Board Turner," the disclosures of which are hereby incorporated by reference.

BACKGROUND

Scanning and optimization techniques are used in some sawmills to determine the best orientation and position for a workpiece upstream of a processing machine that will be used to remove material from the workpiece (e.g., by cutting, chipping, or planning) according to an optimized cut solution. Removing the material from a flawed portion of the workpiece, as opposed to a clear wood portion, can help to improve grade and profitability.

Planers typically remove more material from the top of the workpiece than from the bottom. For that reason, it is generally desirable to send boards through the planer in a wane-up orientation.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 2B-F illustrate components of a board turner assembly;

FIG. 3 illustrates a plan view of the board turner system components shown in FIG. 2;

FIG. 7 illustrates a plan view of the board turner system as shown in FIG. 1A;

FIGS. 8A-8D illustrate sectional views taken along corresponding lines of FIG. 7;

DETAILED DESCRIPTION OF DISCLOSED EMBODIMENTS

Figure 1A:
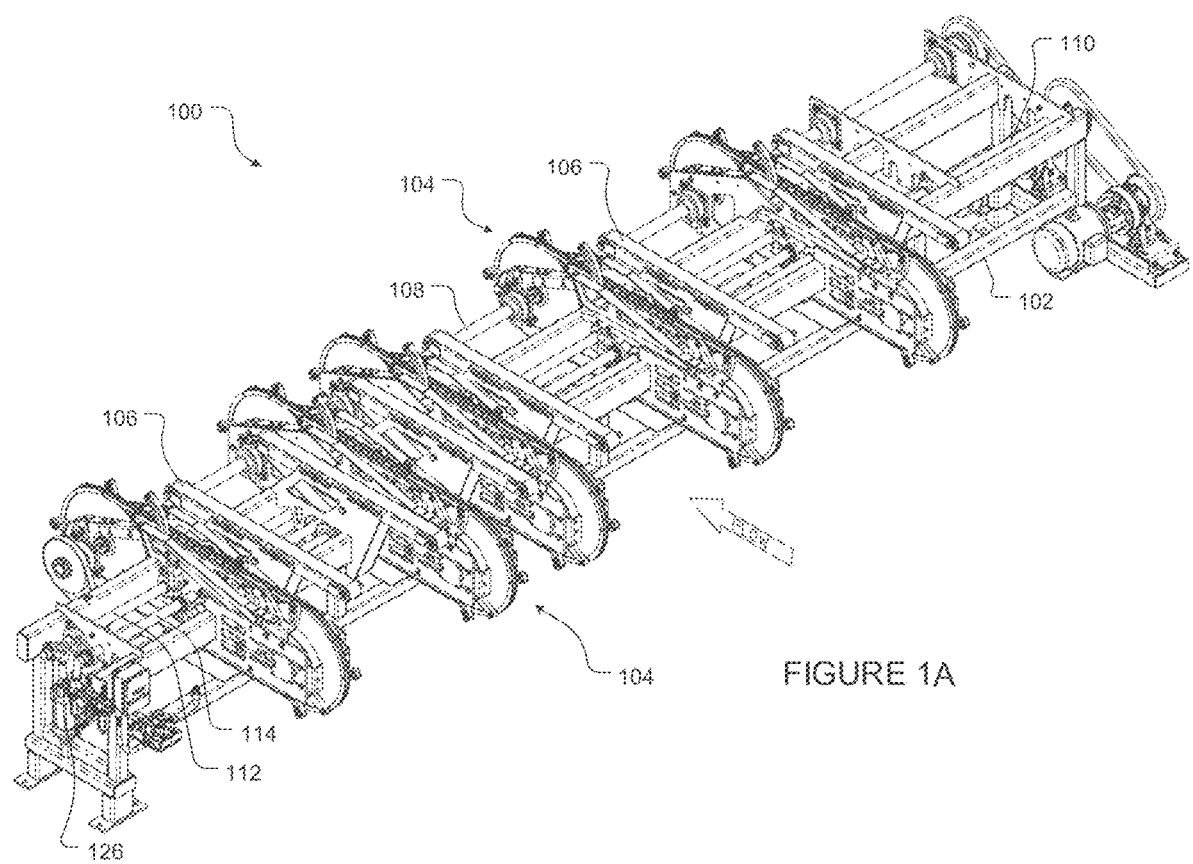
FIG. 1A illustrates a perspective view of a board turner system, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

Embodiments herein provide embodiments of systems, methods, and apparatuses for turning a workpiece about a longitudinal axis of the workpiece by approximately 180 degrees, such that the formerly upward-facing side of the workpiece becomes the downwardly-facing side and vice versa. As used herein, the term "workpiece" encompasses boards, flitches, cants, and other articles with generally opposite faces.

A board turner assembly may include an endless chain rotatable in a flow direction within a reference plane, a first pivot member coupled to the endless chain, and at least one turner arm pivotably coupled to one side of the endless chain by the pivot member and generally parallel to the reference plane. The endless chain may be rotated in the flow direction to thereby move the turner arm along a rotational path. In some embodiments, the endless chain may be a roller chain. Alternatively, the endless chain may be another type of chain or a belt. Although the description below refers to certain features as chains or belts by way of explanation, it is to be understood that in other embodiments a belt may be substituted for a chain and vice versa.

The turner arm may be generally angular or hook-shaped, with a base portion and an arcuate portion that meet at an angle to form a bend, and first and second terminal ends defined by the base portion and arcuate portion, respectively.

In various embodiments, a second pivot member may be coupled to the endless chain at a distance from the first pivot member, and the arcuate portion of the turner arm may include a pivot member guide surface (e.g., a slot, channel, groove, or the like) configured to engage the second pivot member. The pivot member guide surface may be generally arcuate along some or all of its length. The pivot member guide surface may have first and second ends located near the bend and the second terminal end of the turner arm, respectively. A guide member such as a cam follower, pin, roller, bearing, or the like may be coupled to the turner arm to extend from one side of the turner arm.

The first terminal end of the turner arm may be pivotably coupled to the endless chain by the first pivot member. The pivot member guide surface may be movably coupled to the second pivot member. For example, in some embodiments the pivot member guide surface may be a slot that extends through the arcuate portion, and the second pivot member may extend at least partially through the slot. Regardless, the turner arm may be pivotable around the first pivot member between a resting position and an extended position as the turner arm is moved in the flow direction by the endless chain. In the resting position the second end of the pivot member guide surface may be proximal to or in contact with the second pivot member, with most of the arcuate portion extending downwardly below the second pivot member. In the extended position, the first end of the pivot member guide surface may be proximal to or in contact with the second pivot member, with most of the arcuate portion extending above/forward of the second pivot member.

An upper guide may be provided within or near the plane of the turner arm. The upper guide may be coupled to an actuator that is selectively operable to raise and lower the upper guide between an engaging position and a resting position. The upper guide may have a guide surface that extends longitudinally in the flow direction and is inclined in the flow direction when the guide is in the engaging position. For example, in some embodiments the upstream end of the upper guide may be pivotably coupled to a frame or support surface and the downstream end of the upper guide may be raised and lowered by the actuator, and the guide surface may be substantially horizontal in the resting position and inclined in the engaging position. In other embodiments, both ends of the upper guide may be raised and lowered simultaneously by the actuator, and the guide surface may be inclined in both positions.

To execute a turning operation, the actuator may be operated to move the upper guide into the engaging position as the turner arm moves in the flow direction toward the upper guide from a starting position (e.g., at the top of the rotational path and upstream of the upper guide). As the guide member moves along the guide surface, the guide member may be pushed upwardly by the incline causing the turning arm to rotate from the resting position to the extended position. Once the turner arm passes the guide member and the guide member disengages from the downstream end of the guide surface, the turner arm may rotate back to the resting position. In some embodiments, a return guide may be provided along some or all of the rotational path of the turner arm to return the turner arm to the resting position and/or to maintain the turner arm in a resting position as the turner arm is moved back to the starting position again. Optionally, a lower guide may also be provided below the upper guide to thereby limit upward movement of the turner arm as it returns to the starting position.

In various embodiments, a board turner assembly may include a plurality of pivot members coupled to the endless chain at regular intervals, and turning arms may be arranged along at least one side of the endless chain and coupled to corresponding pivot members. Optionally, turning arms may be arranged along both sides of the endless chain in an alternating manner, and corresponding upper guides (and optionally, return guides and/or lower guides) may be provided on each side. In this configuration a turning arm on one side may be used to turn one board and the next turning arm on the other side may be used to turn the next consecutive board.

In various embodiments, a board turning system may include two or more board turner assemblies positioned along a conveyor. Optionally, the conveyor may be a lugged chain/belt conveyor configured to convey the boards in a transverse orientation relative to the direction of flow. The board turner assemblies may be spaced apart in lateral alignment across the flow direction of the conveyor. In some embodiments one or more of the board turner assemblies may be positioned between chains or belts of the conveyor. In some embodiments the guides of the board turner assemblies may be operatively linked to one actuator. In other embodiments some of the guides may be operatively linked to one actuator and other guides may be operatively linked to another actuator. For example, at least some of the board turning assemblies may have turning arms and corresponding guides on both sides of the endless chain, with the guides on the left side linked to one actuator and the guides on the right side linked to a second actuator.

In various embodiments the system may further include a scanner positioned upstream of the board turner assemblies. The scanner may be configured to scan each board as it moves through the field of view of the scanner in the flow direction and to determine, based on the scan, whether the board should be turned (e.g., wane side down to wane side up, or vice versa). The scanner may be further configured to control the actuators, either directly or via a controller, to raise and lower the guides to thereby turn selected boards.

FIGS. 1A-8D illustrate an example of a board turning system and components thereof, in accordance with various embodiments. As illustrated, a board turner system 100 (FIG. 1A) may include a frame 102, a plurality of board turner assemblies 104 coupled with the frame, and a plurality of belt conveyors 106 coupled with the frame. The system 100 may further include a headshaft 108, belt drive shaft 110, and drive shafts 112 and 114. The belt conveyors and board turner assemblies may be arranged across, and oriented substantially parallel to, a flow direction. Collectively, the belt conveyors may form a workpiece support surface that extends within a plane above the upper surface of the endless chains. The belt conveyors and the endless chains may be driven by corresponding separate drives 116 (FIG. 7), which may be operable independently of one another.

Optionally, some or all of the belt conveyors may have separate drives such that they can be driven independently of one another at different speeds and/or in different directions (e.g., to correct workpiece skew). Similarly, some or all of the endless chains may have separate drives such that they can be driven independently of one another. Alternatively, all of the belt conveyors may be driven by one drive and all of the endless chains may be driven by another drive. As another alternative, at least one of the belt conveyors and at least one of the endless chains may be coupled together and driven by a single drive.

Figure 2A:
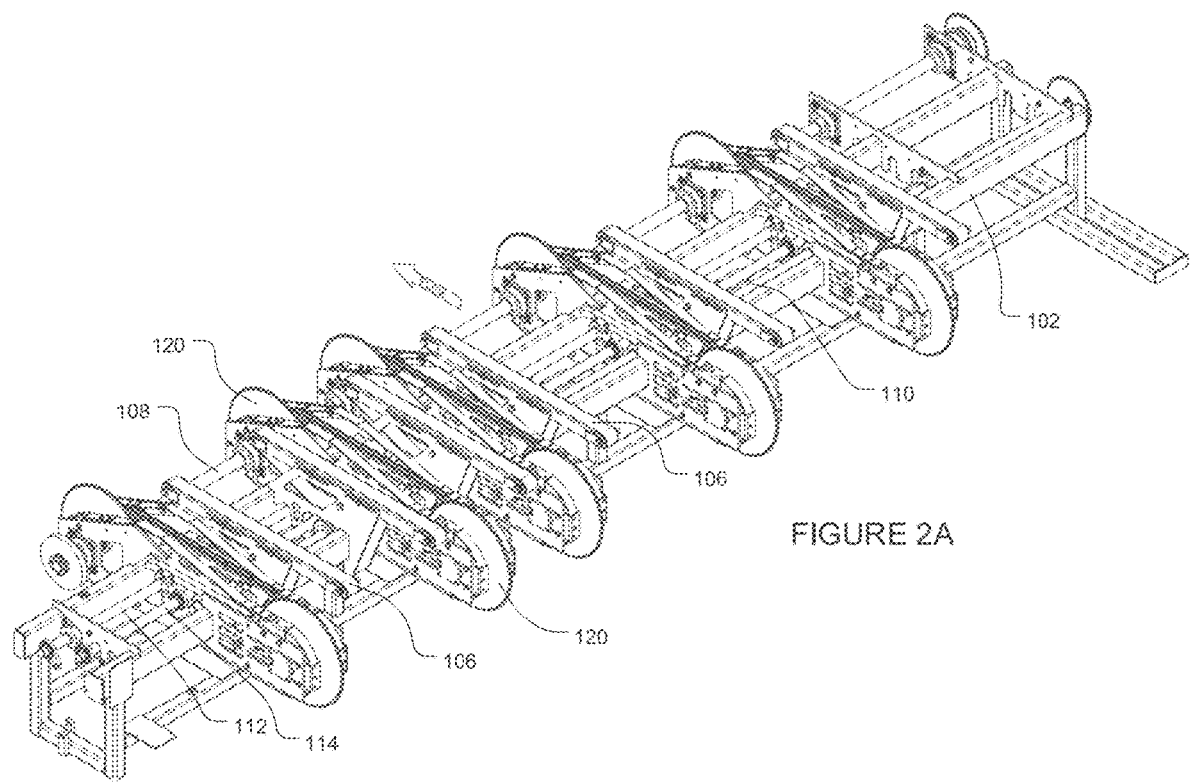
FIG. 2A illustrates a perspective view of the board turner system of FIG. 1A, with some components removed for clarity.
Figure 4:
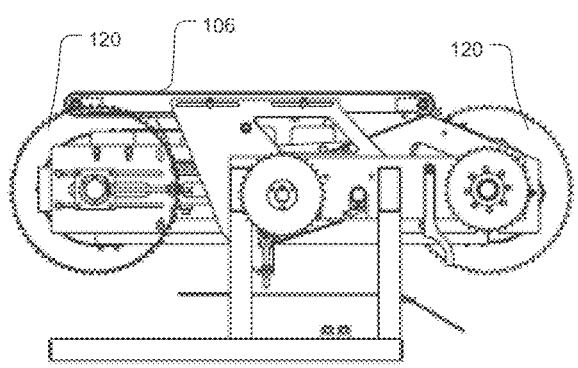
FIG. 4 illustrates a side view of the board turner system components shown in FIG. 2.
Figure 5:
FIG. 5 illustrates an end view of the board turner system components shown in FIG. 2.
Figure 6A:
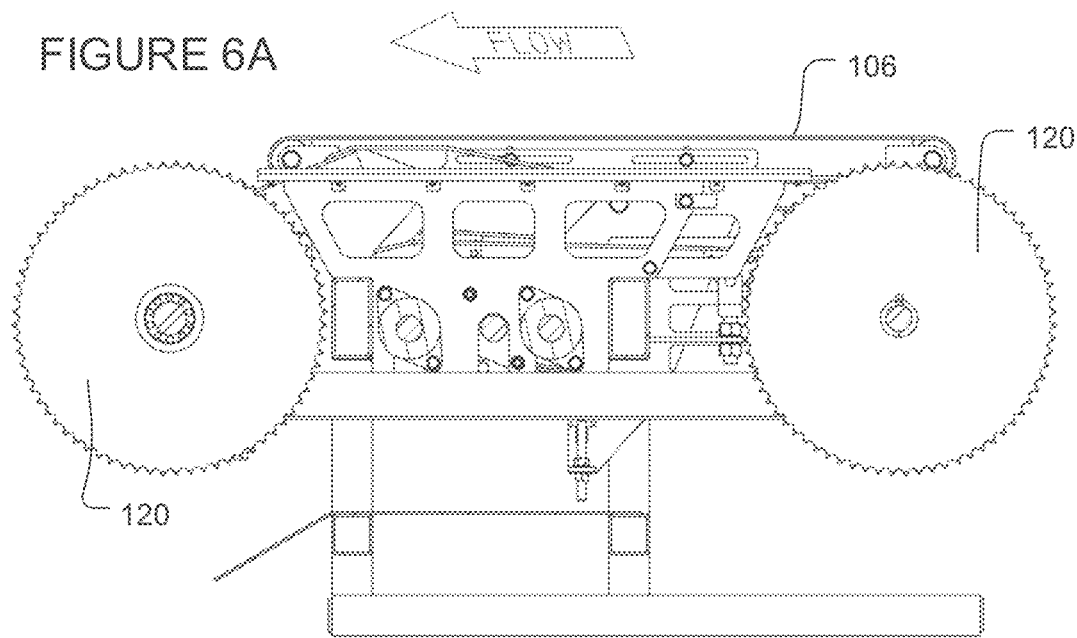
FIGS. 6A-6D illustrate sectional views taken along corresponding lines of FIG. 5.
Figure 6B:
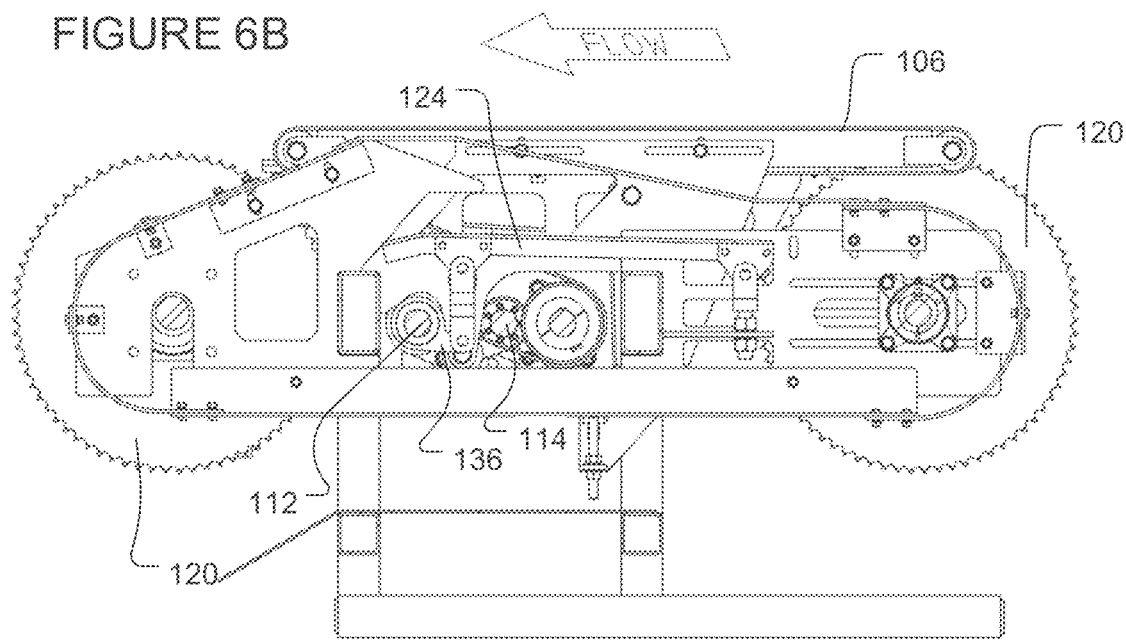
Figure 6C:
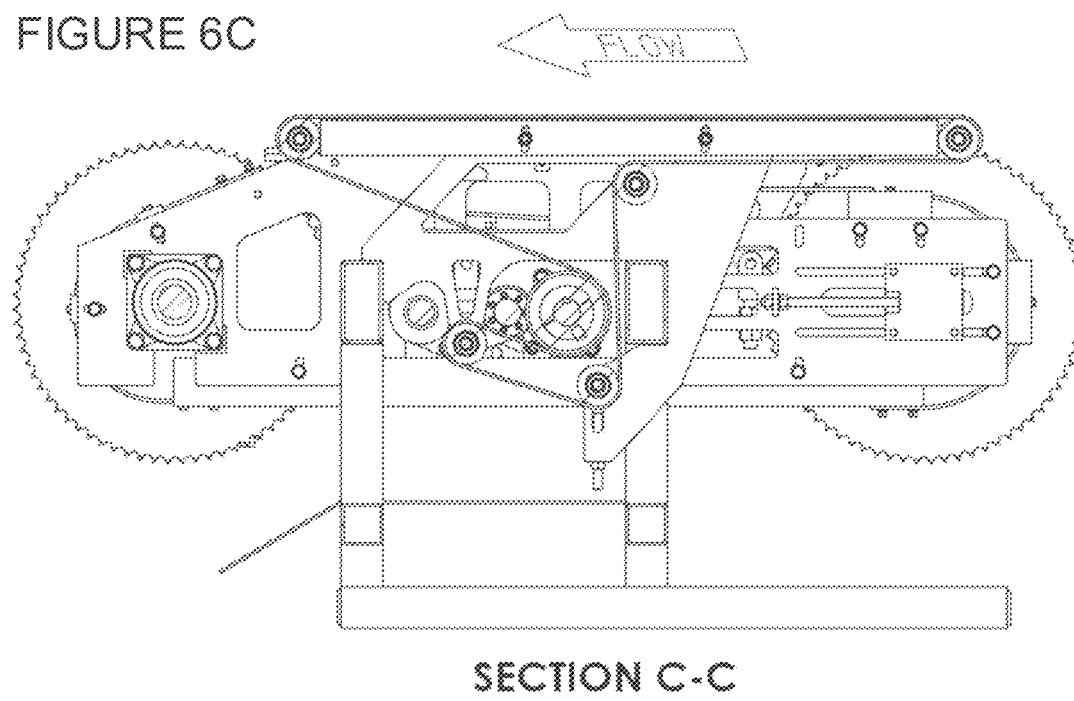
Figure 6D:
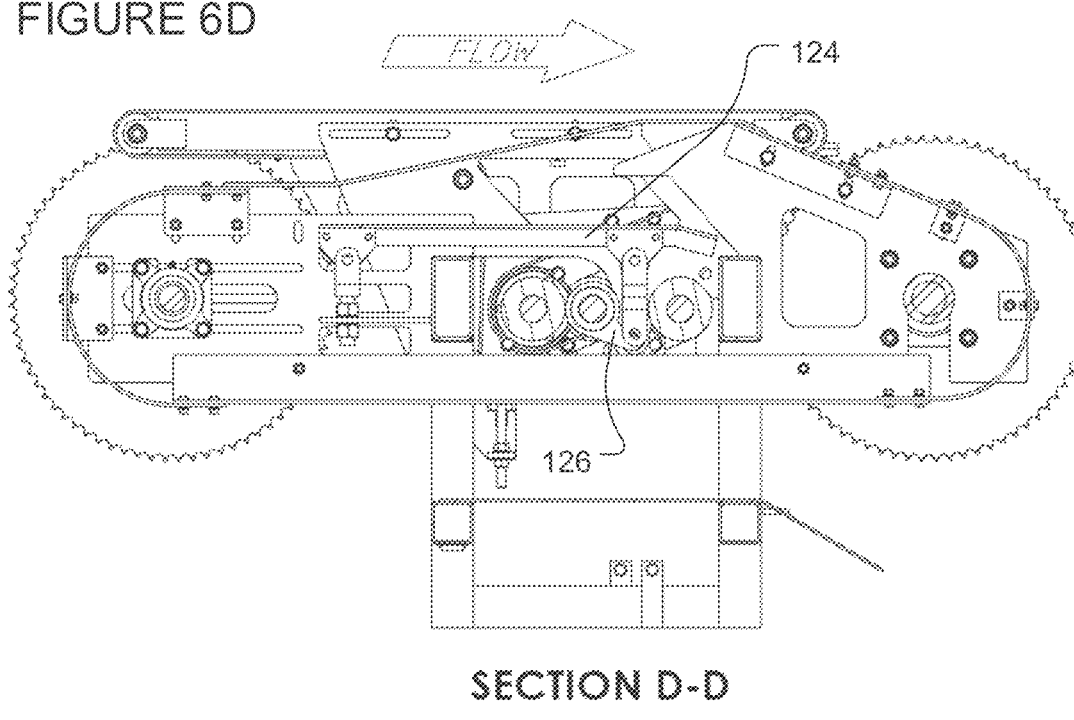

In various embodiments, as best shown in FIGS. 2A-2F, 6B, and 8B, a board turner assembly 104 may include an endless chain 118 mounted on a pair of sprockets 120, first and second groups of turning arms 122 pivotably mounted to opposite sides of the endless chain, an upper guide 124 and an actuator 126 selectively operable to raise and lower the upper guide. The turning arms 122 may be generally planar and hook-shaped or sickle-shaped, with an arcuate portion 122a and a base portion 122b. The arcuate portion may have a pivot member guide surface 122c. The pivot member guide surface may be an arcuate track, slot, groove, channel, or other such feature formed on or through the arcuate portion. The free end of the base portion 122b may be pivotably coupled to the corresponding chain by a first pivot member 128, which may include a cam follower, pin, bolt, or other suitable fastener. As shown in FIGS. 2D-F, in some embodiments pivot member 128 may include a rod or pin that extends through the chain, and the turner arm may have a corresponding hole at the terminal end of the base portion through which the rod may be inserted. Optionally, the turner arm may be retained on the rod or pin by one or more bolts or other fasteners on one or both sides of the turner arm. Other embodiments may include pivot members of other types and configurations, as will be readily appreciated by one with skill in the art in light of the present disclosure.

The free end of the arcuate portion 122a may be slideably coupled to the corresponding endless chain by a second pivot member 130, which may be of the same or different type as the first pivot member 128. One end of the second pivot member 130 may be coupled to the endless chain and the other end may be disposed within or through the pivot member guide surface 122c. A guide member 132 may be coupled to one side of each turning arm in an orientation that is orthogonal to the plane of the turning arm. As the endless chain 118 is rotated on the sprockets 120 in the direction of flow, the turning arms 122 on each side of the endless chain may be circulated along an ovoid rotational path, such that each turning arm travels upwardly at the upstream end of the board turner system, moves in the direction of flow along the top of the path to the downstream end, travels downwardly at the downstream end of the board turner system, and subsequently travels against the direction of flow to return to the upstream end.

Each upper guide 124 may be positioned along, and proximal to, a corresponding side of a corresponding endless chain. The upper guides 124 may be movable between a resting position, in which the upper surface of the upper guide remains below the guide members 132 as they move in the flow direction, and an extended position, in which at least a portion of the upper surface of the upper guide is elevated above the path of an approaching guide member 132. Optionally, the actuator 126 may include an air cylinder. Alternatively, the actuator 126 may include a hydraulic cylinder, an electric screw drive or other linear positioner, an eccentric wheel, or any other suitable mechanism. In some embodiments, the upper guides 124 may include a generally elongate portion with opposite ends pivotably coupled with the actuator and the frame, respectively.

Figure 1B:
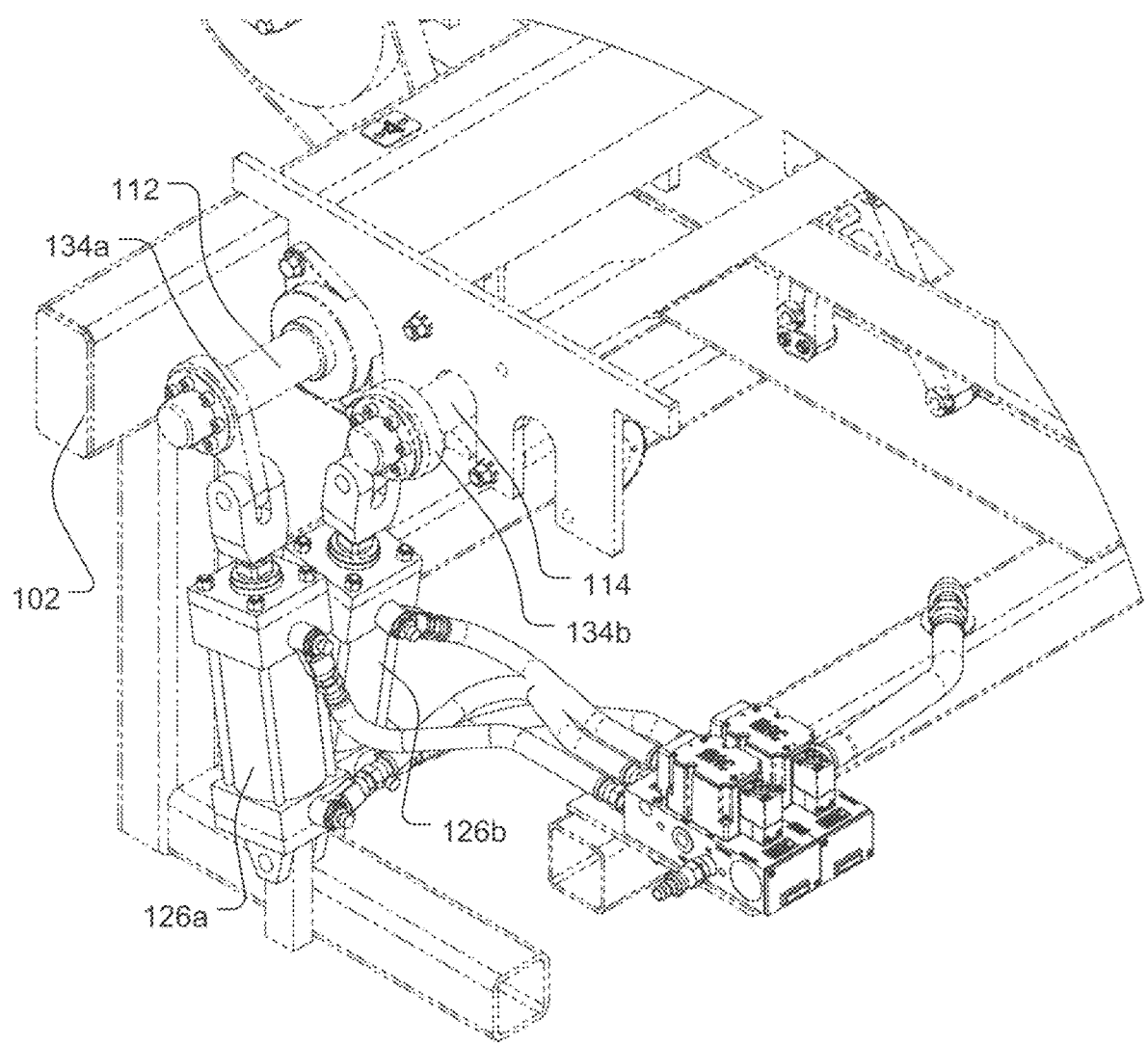
FIG. 1B illustrates an enlarged view of a portion of FIG. 1A, with some components removed for clarity.

In various embodiments, actuator 126 may include first and second actuators 126a and 126b pivotably coupled to corresponding torque arms 134a and 134b, respectively (FIG. 1B). Each actuator 126a/126b may be pivotably coupled to the corresponding torque arm by a clevis or any other suitable fastener. The torque arms 134a and 134b may be rigidly coupled to shaft 112 and 114, respectively. Thus, each actuator 126a/126b may be actuable to rotate the corresponding shaft 112/114 in opposite rotary directions. Some of the upper guides 124 (e.g., those on one side of the endless chains, or on one side of the longitudinal center of the conveyor) may be operatively coupled to shaft 112, and other upper guides 124 (e.g., those on the opposite side of the endless chains, or those on the other side of the longitudinal center) may be operatively coupled to shaft 114. Optionally, a downstream end of each upper guide 124 may be coupled to the corresponding shaft by a corresponding torque arm 136 (FIG. 6B), and an upstream end of each upper guide 124 may be pivotably coupled to the frame or a support member to thereby allow the downstream end of the upper guide to be raised relative to the upstream end. In other embodiments, all of the upper guides 124 may be operatively coupled to one shaft, or to corresponding actuators that are operable independently of one another.

In some embodiments, all of the turning arms 122 and upper guides 124 may be disposed along only one side of the endless chains 118. Alternatively, in some embodiments turning arms 122 and upper guides 124 may be positioned on both sides of some or all of the endless chains 118. Optionally, a return guide 156 may be provided along some or all of the rotational path of the turner arm (FIG. 8B). Return guide 156 may be configured to return the turner arm to the resting position, and/or to maintain the turner arm in a resting position as the turner arm is moved back to the starting position again. Optionally, a lower guide 158 (FIG. 6B) may be provided below the upper guide. The lower guide 158 may have a guide surface positioned near the return path of the guide members 132 to thereby limit upward movement of the turner arm as it returns to the starting position.

The pivot members 128/130 and turning arms 122 may be spaced at regular intervals along each endless chain. In embodiments with turning arms on both sides, the turning arms along the left side of each endless chain may be aligned with one another, and the turning arms along the right side of each endless chain may also be aligned one another. However, the intervals between the turning arms on one side may be offset relative to the intervals between the turning arms on the other side, such that a turning arm on one side is half (or some other fraction) of the interval distance upstream or downstream of the corresponding turning arm on the opposite side.

In some embodiments, the board turner system 100 may be disposed along a conveyor 138a (such as a lugged conveyor and/or multiple conveyors overlapping end-to-end), with the system's components arranged in groups between adjacent chains and positioned such that the belt conveyors 106 and the chains/belts of the conveyor form a common workpiece support surface. Some or all of the groups of components may include at least one of the endless chains 118, the corresponding pair of board turners 122 disposed along the opposite sides of the endless chain 118, and at least one of the belt conveyors 106. The offset arrangement of the turning arms on the opposite sides of the endless chains allows the turning arms to be used in an alternating fashion, with a given side being used to turn only every second board. The board turning operation can thus be completed over two lug spaces to allow smoother operation, more rapid turning, and greater speed along the processing line. Alternatively, a similar offset arrangement may be achieved by mounting turning arms on only one side of some endless chains and only on the other side of other endless chains.

Figure 9:
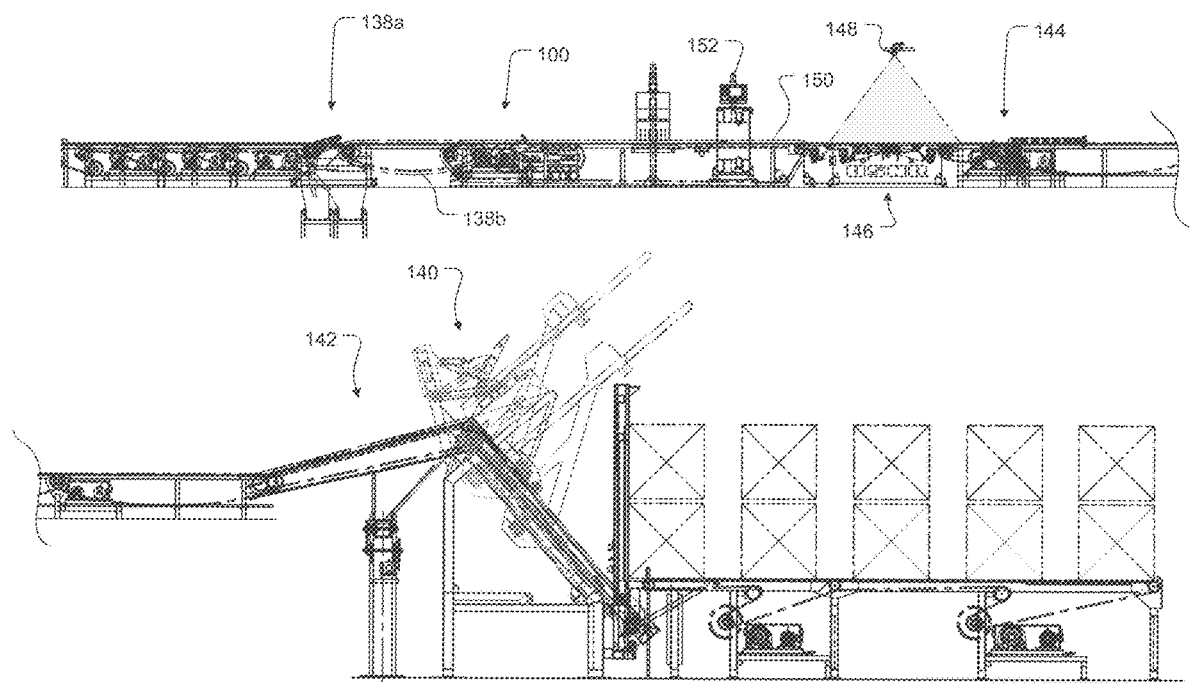
FIG. 9 illustrates an example of a planer infeed line with a board turner system.

Board turner systems as described herein may be used in various locations along processing lines in facilities such as sawmills and planermills. FIG. 9 is a schematic diagram of a planer infeed line with an on-demand board turner, in accordance with various embodiments.

As illustrated, a planer infeed line may include a tilt hoist 140, a lugged let-down 142, a pre-gap/storage table 144, a lug loader 146, a first sensor 148 positioned to detect workpieces engaged by the lug loader, a lugged conveyor 150, a second sensor 152 positioned to detect workpieces on the lugged conveyor, a board turner system 100, and a drop-out/articulating gate 154 upstream of a planer (not shown). Some or all of these components may be arranged sequentially. Optionally the planer infeed line may include one or more additional components such as a stick/dunnage collector, conveyor, transfer, storage table, bins, or the like. Collectively, the components may form a continuous flow path from the tilt hoist to the planer.

The tilt hoist 140 may be a Continuous Tilt Hoist (USNR, LLC), which may include linear transducers and servo valves actuated from a PLC. The Continuous Tilt Hoist may be configured to handle packages of particular dimensions (stickered), with packages stacked 2 high at the tilt hoist and dunnage between. Alternatively, the planer infeed line may include a beam-style, leaf-chain, or other type of tilt hoist, or any other suitable alternative, instead of a Continuous Tilt Hoist.

The lug loader 146 may be a Virtual Lug Loader (USNR, LLC) with a series of belts that are progressively adjusted to separate and/or deskew the workpieces, then feed the workpieces into the lug spaces of the lugged conveyor. In other embodiments, the lug loader may instead be any other suitable type of lug loader.

The lugged conveyor 150 may be positioned at an output end of the lug loader 146. The first sensor 148 may be positioned to detect workpieces on the lug loader 146 or just upstream/downstream of the lug loader. In the illustrated example, the planer infeed line includes a MillTrak™ system (USNR, LLC) with a single vision camera, and the first sensor 146 (a single vision camera) is mounted above the lug loader. In this embodiment, the MillTrak™ System is configured to control both the backlog and actuation of the belts of the Virtual Lug Loader. In other embodiments, the first sensor may be one or more photoeyes, proximity sensors, or other sensor(s) in any suitable number, placement, and configuration, and may be operatively coupled with a computer system programmed to control the lug loader.

The lugged conveyor 150 may be positioned downstream of the lug loader 146 to accept workpieces from the lug loader. The second sensor 152 may be positioned along the lugged conveyor 150 to detect the orientation of the workpieces on the conveyor 150. In some embodiments, the second sensor 152 may include one or more geometric/laser profile sensors, such as LPS3 sensors (USNR). Alternatively, the second sensor 152 may include a vision sensor or other type of sensor.

The second sensor 152 may serve as a wane scanner for determining whether a board is wane side up or wane side down. The second sensor 152 may be configured to scan the board and determine, based on the scan data, whether the board is in a desired orientation. Alternatively, the second sensor may be coupled with a computer system with optimization software for determining, based on the scan data from the second sensor, whether the workpiece is in a desired orientation. The computer system may also be configured to determine the desired orientation for the workpiece based on the scan data from the second sensor, data from the first sensor, and/or data from other sensors further upstream. In response to a determination that the workpiece is not in the desired orientation, the computer system may generate and send a command to an actuator (e.g., actuator 126), or to a controller operatively coupled to the actuator, to cause the board turner to turn the workpiece. Alternatively, the second sensor may be configured to perform some or all of these functions.

Figure 10:
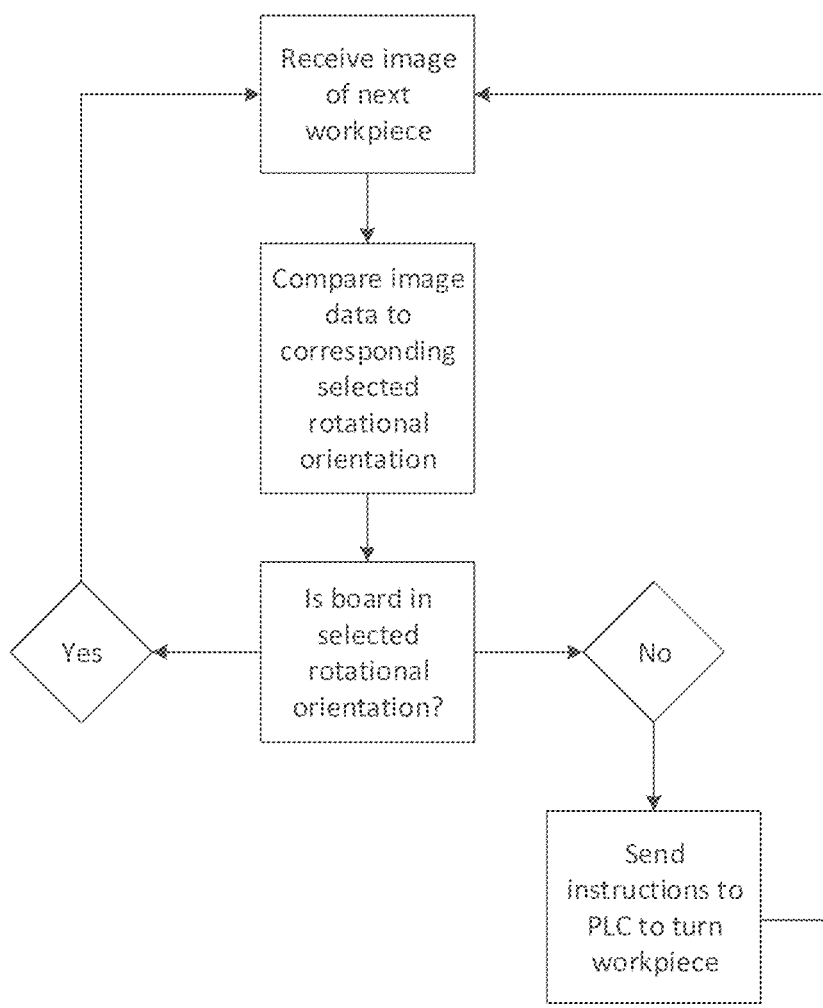
FIG. 10 illustrates a flow diagram of a board turner control process, all in accordance with various embodiments.

In operation, as boards travel in the flow direction in corresponding lug spaces, the boards may pass through the field of view of the second sensor 152. As shown for example in FIG. 10, the second sensor may detect the geometric profile of each workpiece, which may then be compared (by the second sensor or computer system) to the desired orientation for that workpiece. Such information may be organized/compared based on queue positions, on a first-in-first-out basis, or in any other suitable manner. Upon determining that a workpiece is not in the desired orientation, the second sensor or computer system may send a command to a PLC to cause the actuators 126 of the corresponding group of upper guides 124 to thereby move those upper guides into the extended position. As the corresponding group of guide members 132 engage the elevated upper guides 124, the guide members 132 may be moved along the incline, thereby causing forward rotation of the turning arms 122 and engagement of the leading surface of the arcuate portion 122a with the lagging lower edge of the workpiece. Optionally, the belt conveyors 106 may be rotated at a slower speed than the lugged conveyor to urge the workpiece backward against the leading surface of the arcuate portions, which helps to urge the lagging edge of the workpiece upward and forward and to turn the board over in a forward direction.

In other embodiments, a board turner system may be provided near a grading station. The board turner assemblies/system may be operated to turn over selected workpieces, or all workpieces, within the view of a human or mechanical grader. Alternatively, board turner assemblies and/or a board turner system may be provided upstream of an edger to selectively turn flitches prior to edging. Other applications for such assemblies and systems will be readily apparent to the skilled artisan.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A system for turning elongated workpieces as they travel in a flow direction on a workpiece support surface, in an orientation that is transverse to the flow direction, the system comprising:

a plurality of first turner assemblies oriented generally parallel to the flow direction and spaced apart across the flow direction, wherein each of the first turner assemblies includes a first endless member rotatable within a respective plane that is substantially parallel to the flow direction, a plurality of turner arms pivotably coupled to the first endless member at intervals, and at least one guide having a guide surface, wherein the guide is movable from a retracted position to an engaging position in which at least a portion of the guide surface is positioned to engage a portion of a corresponding one of the turner arms, as said turner arm is carried in the flow direction by rotation of the endless member, to thereby pivot said turner arm in a first rotational direction from a resting position to an extended position in which at least part of said turner arm extends above the workpiece support surface; and means for moving at least two of the guides independently of one another between the retracted position and the extended position.

2. The system of claim 1, wherein said means for moving at least two of the guides includes at least a first actuator and a second actuator, and each of said actuators is selectively operable to move a corresponding one or more of the guides between the retracted position and the engaging position.

3. The system of claim 2, wherein the first actuator is operably coupled with a first group of the guides and the second actuator is operably coupled with a second group of the guides.

4. The system of claim 2, wherein in two or more of the first turner assemblies, the at least one guide includes a first guide and a second guide disposed on opposite first and second sides, respectively, of the respective endless member, the first actuator is operatively coupled with the first guides, and the second actuator is operatively coupled with the second guides.

5. The system of claim 4, wherein in said two or more of the first turner assemblies, the turner arms includes a plurality of first turner arms and a plurality of second turner arms disposed on opposite first and second sides, respectively, of the endless member in an alternating manner.

6. The system of claim 2, wherein the intervals between the turner arms of a first group of the first turner assemblies are offset relative to the intervals between the turner arms of a second group of the first turner assemblies, the first actuator is operatively coupled with the guides of the first group, and the second actuator is operatively coupled with the guides of the second group.

7. The system of claim 2, wherein the first actuator and a first group of the guides are pivotably coupled with a first shaft that extends transverse to the flow direction, and the second actuator and a second group of the guides are pivotably coupled with a second shaft that extends transverse to the flow direction, and the actuators are selectively operable to rotate the respective shafts in opposite rotary directions to thereby move the respective guides between the retracted position and the extended position.

8. The system of claim 2, further including a plurality of conveyors spaced apart across, and oriented substantially parallel to, the flow direction, wherein the conveyors collectively define a portion of the workpiece support surface and at least some of the endless members are positioned between respective ones of the conveyors.

9. The system of claim 8, further comprising a first drive operatively coupled with the endless members and one or more second drives operatively coupled with the conveyors, wherein the first drive is selectively operable to drive the endless members independently of the conveyors.

10. The system of claim 9, wherein the one or more second drives includes at least two second drives operatively coupled with corresponding ones of the conveyors such that at least some of the conveyors can be driven independently of one another at different speeds and/or in different directions.

11. The system of claim 10, further comprising a frame, wherein the first turner assemblies and the conveyors are mounted to the frame.

12. The system of claim 11, wherein the first sensor is a laser profile sensor.

13. The system of claim 11, wherein the first sensor is a laser profile sensor.

14. The system of claim 9, further including a first sensor positioned to detect each of the workpieces on the workpiece support surface, wherein the first sensor is configured to determine whether each of the workpieces is wane side up or wane side down.

15. The system of claim 14, further including a computer system operatively coupled with the first sensor and the first actuator, wherein the computer system is configured to control the actuators based at least on data received from the first sensor.

16. The system of claim 14, wherein the first sensor is a laser profile sensor.

17. The system of claim 14, wherein the first sensor is a vision sensor.

18. The system of claim 2, further including a first sensor positioned to detect each of the workpieces on the workpiece support surface, wherein the first sensor is configured to determine whether each of the workpieces is wane side up or wane side down.

19. The system of claim 18, further including a computer system operatively coupled with the first sensor and the first actuator, wherein the computer system is configured to control the actuators based at least on data received from the first sensor.

* * * * *